(12) United States Patent  (10) Patent No.: US 8,275,369 B2
Li et al.  (45) Date of Patent: Sep. 25, 2012

(54) ELECTRONIC DEVICE AND METHOD OF AUTOMATICALLY TESTING MOBILE COMMUNICATION TERMINALS

(75) Inventors: Shen-Chun Li, New Taipei (TW); Hsien-Chuan Liang, New Taipei (TW); Chun-Neng Liao, New Taipei (TW); Shou-Kuo Hsu, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/293,123

(22) Filed: Nov. 10, 2011

(65) Prior Publication Data

US 2012/0214473 A1 Aug. 23, 2012

(30) Foreign Application Priority Data

Feb. 18, 2011 (TW) .................................. 100105481

(51) Int. Cl.
*H04W 24/00* (2009.01)
(52) U.S. Cl. ...................... 455/423; 455/67.12; 455/115
(58) Field of Classification Search ............... 379/10.01, 379/21, 26.02, 27.04; 455/67.1, 67.2, 67.4, 455/67.11, 67.14, 115.1, 115.2, 226.1, 418, 455/419, 420, 423, 525
See application file for complete search history.

(56) References Cited

U.S. PATENT DOCUMENTS

| 6,680,913 B1* | 1/2004 | Malmivirta et al. .......... 370/249 |
| 2001/0018333 A1* | 8/2001 | Klenner ........................ 455/115 |
| 2005/0149293 A1* | 7/2005 | Chang et al. .................. 702/185 |
| 2005/0176375 A1* | 8/2005 | Bednasz et al. ............ 455/67.12 |

FOREIGN PATENT DOCUMENTS

GB 2409791 A * 7/2005

* cited by examiner

*Primary Examiner* — Wesley Kim
*Assistant Examiner* — Dinh P Nguyen
(74) *Attorney, Agent, or Firm* — Altis Law Group, Inc.

(57) ABSTRACT

A method of automatically testing a mobile communication terminal selects a communication frequency band for testing the mobile communication terminal. The mobile communication terminal switches to the selected communication frequency band. One or more service modes, of the mobile communication terminal, which need to be tested under the selected communication frequency band are selected, and a test sequence of the one or more service modes is set. The mobile communication terminal using one of the service modes. Test data of the mobile communication terminal is obtained according to a preset use duration, a test frequency and the test interval of each service mode. A report is generated using the test data.

15 Claims, 4 Drawing Sheets

ELECTRONIC DEVICE AND METHOD OF AUTOMATICALLY TESTING MOBILE COMMUNICATION TERMINALS

BACKGROUND

1. Technical Field

Embodiments of the present disclosure relate to test devices and methods, and more particularly to an electronic device and a method of automatically testing a mobile communication terminal.

2. Description of Related Art

Many people are using mobile communication terminals, such as mobile phones. Quality of the mobile communication terminal is an important factor for mobile communication service providers who want to share the market.

In order to provide high quality mobile communication terminals, the mobile communication service providers will test the mobile communication terminals before putting them on the market. Although testing the mobile communication terminals can be done by an engineer manually, this is troublesome and must increase the testing time.

DETAILED DESCRIPTION

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
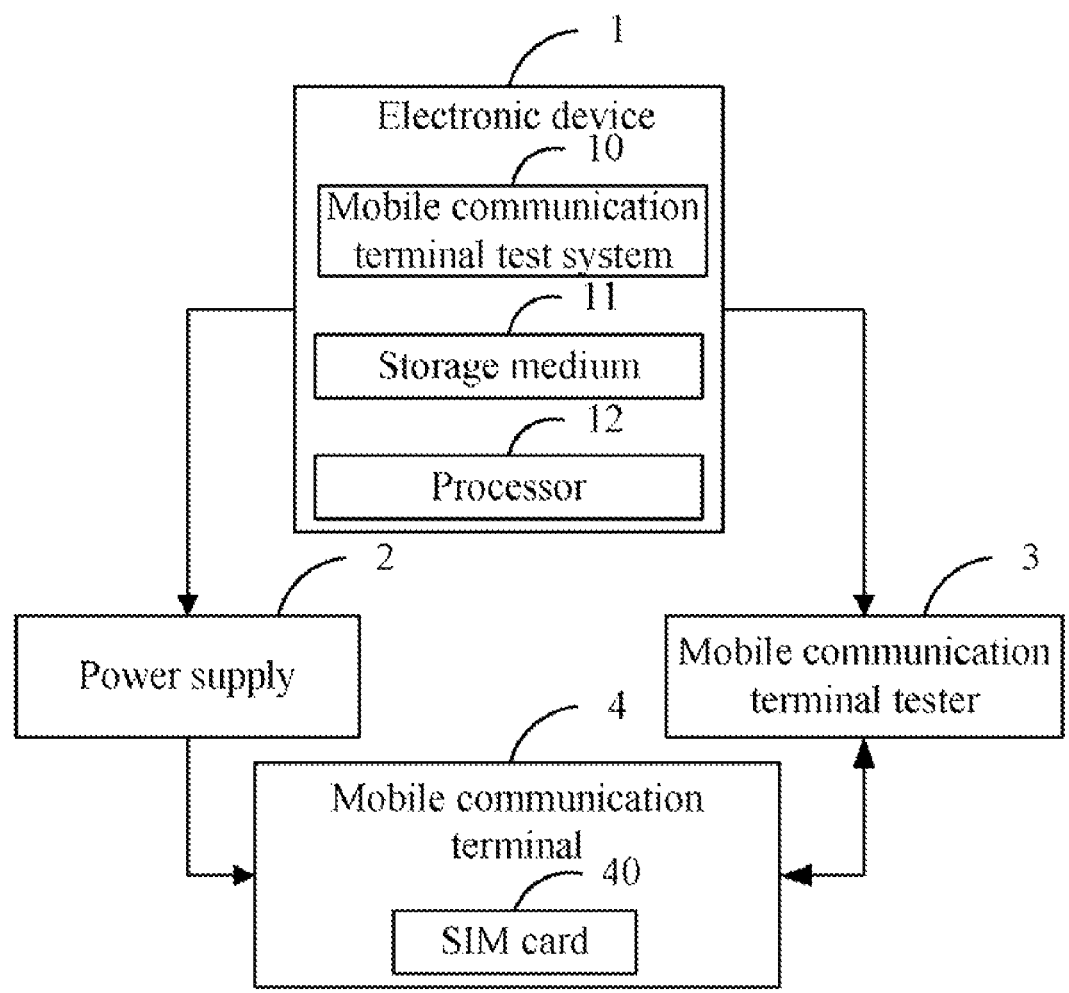
FIG. 1 is a block diagram of one embodiment of an electronic device including a mobile communication terminal test system.

FIG. 1 is a block diagram of one embodiment of an electronic device 1 including a mobile communication terminal test system 10. In the embodiment, the electronic device 1 further includes a non-transitory storage medium (storage medium 11), and at least one processor 12. Depending on the embodiment, the storage medium 11 may be a hard disk drive, a compact disc, a digital video disc, a tape drive or other suitable storage medium.

The electronic device 1 is electronically connected to a power supply 2 and a mobile communication terminal tester 3. The power supply 2 can supply electrical power, such as voltage, to a mobile communication terminal 4, under the control of the electronic device 1. The mobile communication terminal 4 may be a mobile phone, for example. The mobile communication terminal tester 3 is used as a base station, which sends control commands to a subscriber identity module (SIM) card 40 in the mobile communication terminal 4, for testing the ability of the mobile communication terminal 4 to switch between different communication frequency bands and use different service modes. The communication frequency bands may include global system for mobile communications (GSM) 900, GSM 1900, GSM 800, and GSM1800. The service modes may include a sleep mode, a standby mode, a talk mode, and an out of service mode.

Figure 2:
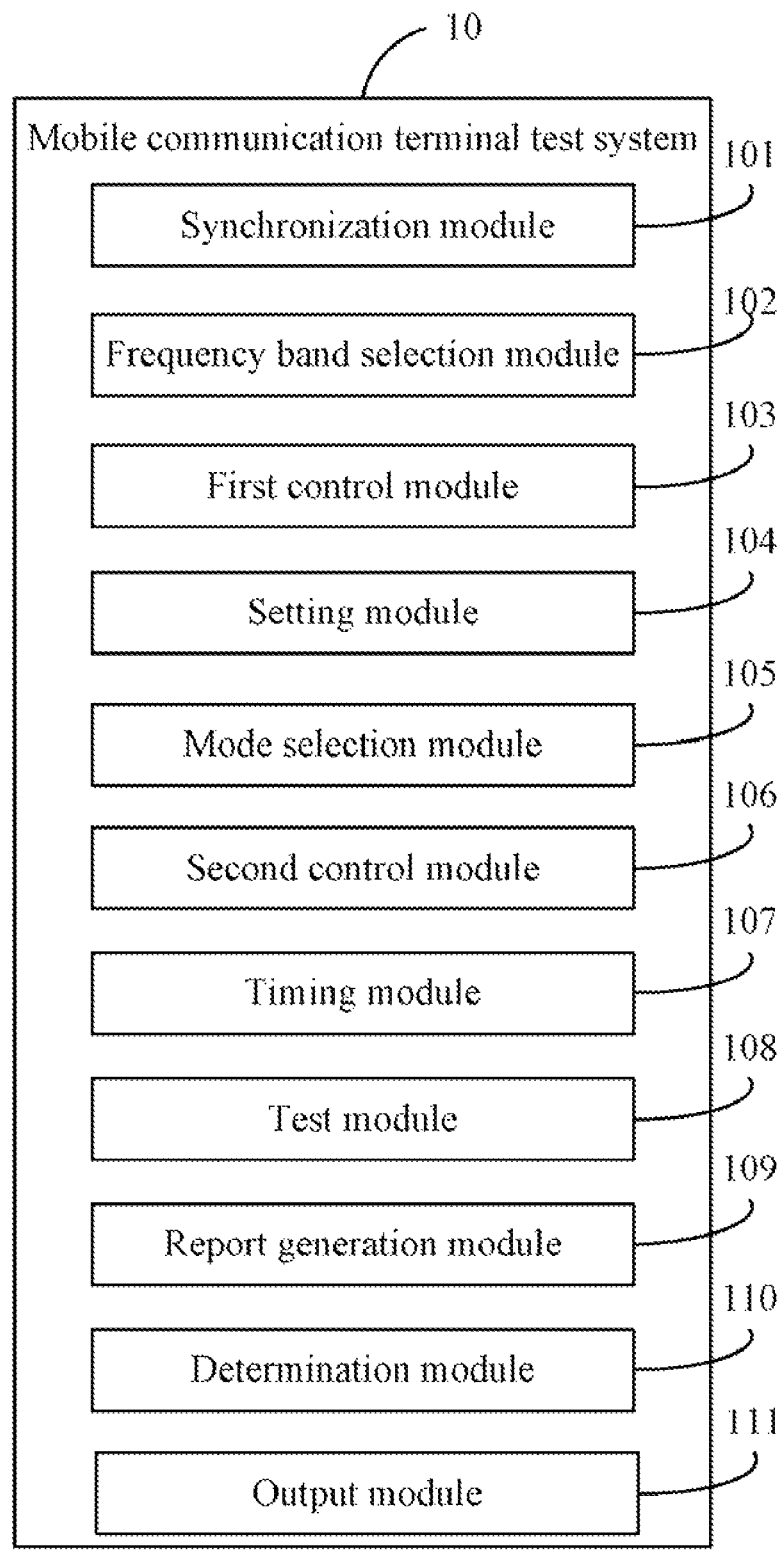
FIG. 2 is a block diagram of one embodiment of function modules of the mobile communication terminal test system of FIG. 1.

The mobile communication terminal test system 10 includes a number of function modules (depicted in FIG. 2). The function modules may comprise computerized code in the form of one or more programs that are stored in the storage medium 11. The computerized code includes instructions that are executed by the at least one processor 12, to automatically test the mobile communication terminal 4 to determine if the quality of the mobile communication terminal 4 is acceptable.

FIG. 2 is a block diagram of one embodiment of the function modules of the mobile communication terminal test system 10. In one embodiment, the mobile communication terminal test system 10 may include a synchronization module 101, a frequency band selection module 102, a first control module 103, a setting module 104, a mode selection module 105, a second control module 106, a timing module 107, a test module 108, a report generation module 109, a determination module 110, and an output module 111. The function modules 101-111 may provide the below mentioned functions (illustrated in FIG. 3).

Figure 3A:
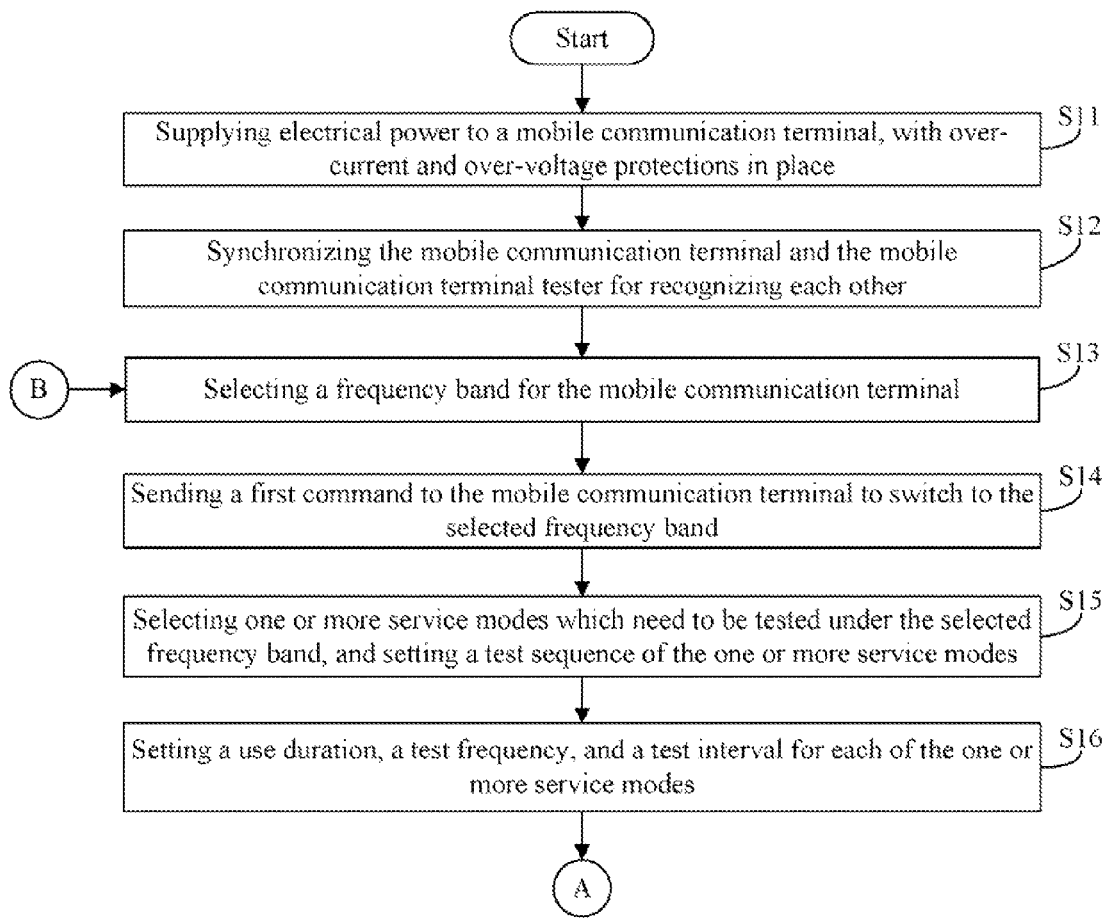
FIG. 3 is a flowchart of one embodiment of a method of automatically testing a mobile communication terminal.
Figure 3B:
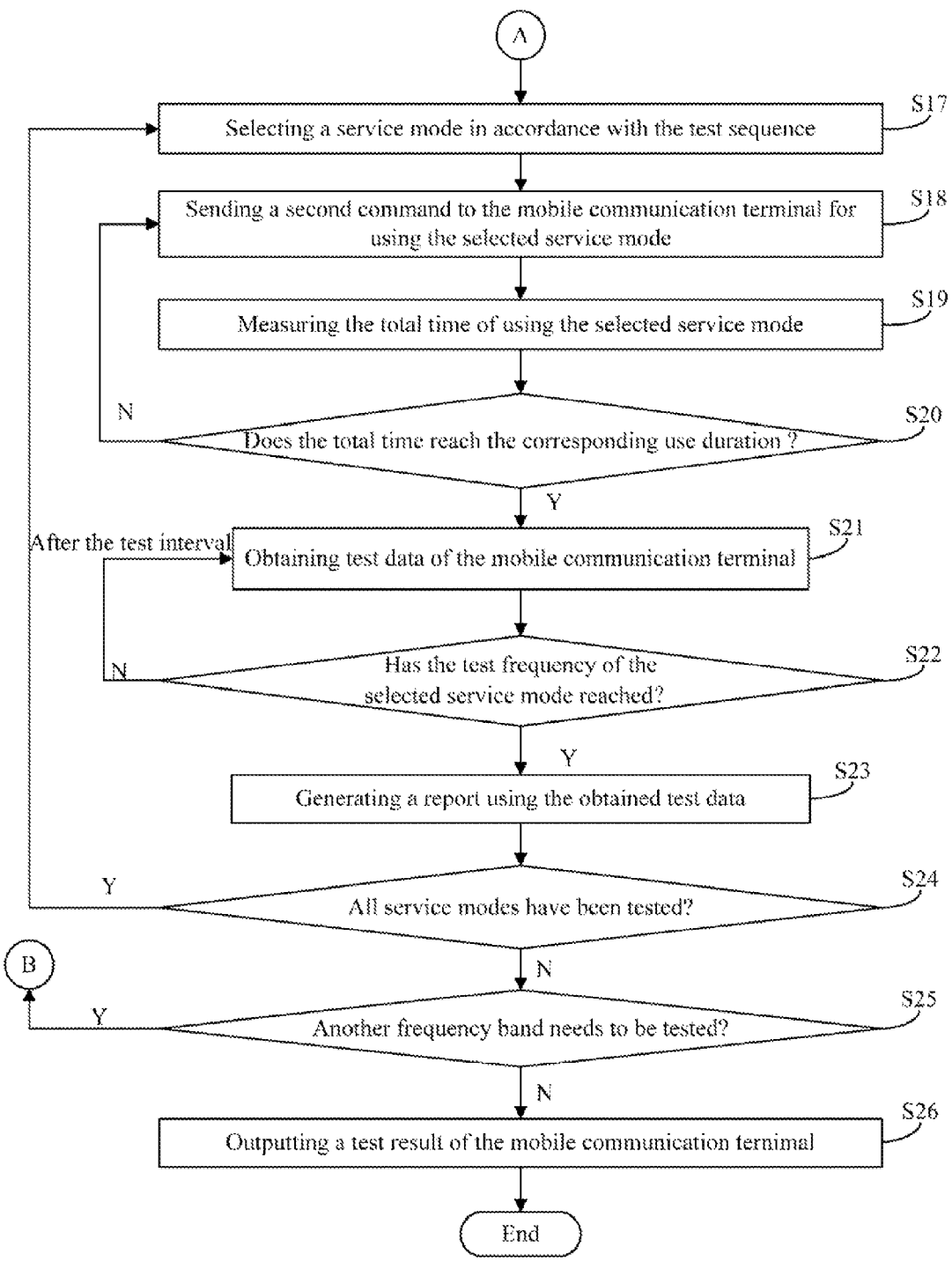

FIG. 3 is a flowchart of one embodiment of a method of automatically testing a mobile communication terminal. Depending on the embodiment, additional blocks may be added, others removed, and the ordering of the blocks may be changed.

In block S11, the power supply 2 supplies electrical power to the mobile communication terminal 4, with over-current and over-voltage protections in place, under the control of the electronic device 1. The over-current and over-voltage protections operate so as to cut off the electrical power supplied by the power supply 2, when the current and/or voltage supplying to the mobile communication terminal 4 is beyond a predetermined value, to avoid damaging the mobile communication terminal 4.

In block S12, the synchronization module 101, using the SIM card 40, synchronizes the mobile communication terminal 4 with the mobile communication terminal tester 3 in order that the mobile communication terminal 4 and the mobile communication terminal tester 3 may recognize each other. The synchronization of the mobile communication terminal 4 is achieved by sending timing advance commands from the mobile communication terminal tester 3 which instructs the mobile communication terminal 4 to transmit earlier and by how much.

In block S13, the frequency band selection module 102 selects a communication frequency band in relation to the mobile communication terminal 4. The communication frequency band can be selected from GSM900, GSM1900, GSM 800, and GSM1800.

In block S14, the first control module 103 controls the mobile communication terminal tester 3 to send a first command to the SIM card 40, to cause the mobile communication terminal 4 to switch to the selected communication frequency band.

In block S15, the setting module 104 selects one or more service modes for the mobile communication terminal 4, which need to be tested under the selected communication frequency band, and sets a test sequence of the one or more service modes. The one or more service modes can be selected from the sleep mode, the standby mode, the talk mode, and the out of service mode.

In block S16, the setting module 104 sets a use duration for each of the one or more service modes, such as 1 minute, sets a test frequency for each of the one or more service modes, such as 5 times, and sets an test interval for each of the one or more service modes if the service mode needs to be tested more than one time, the test interval may be 5 seconds, for example.

In block S17, the mode selection module 105 selects a service mode in accordance with the test sequence.

In block S18, the second control module 106 controls the mobile communication terminal tester 3 to send a second command to the SIM card 40, to cause the mobile communication terminal 4 using the selected service mode.

In block S19, the timing module 107 measures the total time of using the selected service mode. In block S20, the test module 108 determines if the total time reaches the corresponding use duration. Block S18 is repeated if the total time does not reach the corresponding use duration. Otherwise, block S21 is implemented if the total time reaches the corresponding use duration.

In block S21, the test module 108 obtains test data of the mobile communication terminal 4. The test data may include the current and the voltage consumed by the mobile communication terminal 4.

In block S22, the report generation module 109 determines if the test frequency of the selected service mode has reached. Block S21 is implemented after the test interval, if the test frequency of the selected service mode has not reached. Otherwise, block S23 is implemented if the test frequency of the selected service mode has reached.

In block S23, the report generation module 109 generates a report based on the test data.

In block S24, the determination module 110 determines if all service modes of the mobile communication terminal 4 have been tested. Block S17 is repeated if any service mode of the mobile communication terminal 4 has not been tested. If all service modes have been tested, block S25 is implemented.

In block S25, the determination module 110 further determines if the mobile communication terminal 4 needs to tested under another communication frequency band. Block S13 is repeated if the mobile communication terminal 4 needs to tested under another communication frequency band. Otherwise, block S26 is implemented if the mobile communication terminal 4 has been tested with all possible communication frequency bands.

In block S26, the output module 111 outputs a test result of the mobile communication terminal 4 according to the report (s) above.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method of automatically testing a mobile communication terminal, the method being executed by the at least one processor of an electronic device and comprising:
   (a) selecting a communication frequency band for the mobile communication terminal;
   (b) controlling a mobile communication terminal tester to send a first command to a subscriber identity module (SIM) card of the mobile communication terminal, to cause the mobile communication terminal to switch to the selected communication frequency band;
   (c) selecting one or more service modes for the mobile communication terminal that need to be tested under the selected communication frequency band, and setting a test sequence of the one or more service modes;
   (d) setting a use duration for each of the one or more service modes, a test frequency for each of the one or more service modes, and an test interval for each of the one or more service modes upon condition that the service mode needs to be tested more than one time;
   (e) selecting a service mode in accordance with the test sequence;
   (f) controlling the mobile communication terminal tester to send a second command to the SIM card, to cause the mobile communication terminal using the selected service mode;
   (g) measuring the total time of using the selected service mode;
   (h) obtaining test data of the mobile communication terminal according to the test frequency, the test interval, the total time, and the use duration of the selected service mode;
   (i) generating a report based on the test data;
   (j) repeating (e) to (i) until all the service modes need to be tested under the selected communication frequency band have been selected;
   (k) repeating (a) to (j) upon condition that another communication frequency band needs to be tested; and
   (l) outputting a test result of the mobile communication terminal according to the report(s).

2. The method according to claim 1, before (a) further comprising:
   synchronizing the mobile communication terminal and the mobile communication terminal tester using the SIM card, in order the mobile communication terminal and the mobile communication terminal tester recognize each other.

3. The method according to claim 1, wherein the communication frequency band is selected from global system for mobile communications (GSM)900, GSM1900, GSM 800, and GSM1800.

4. The method according to claim 1, wherein the one or more service modes are selected from a sleep mode, a standby mode, a talk mode, and an out of service mode.

5. The method according to claim 1, wherein the test data comprises the current and the voltage of the mobile communication terminal.

6. An electronic device, comprising:
   a non-transitory storage medium;
   at least one processor; and
   one or more modules that are stored in the non-transitory storage medium and are executed by the at least one processor, the one or more modules comprising instructions to:
   select a communication frequency band for a mobile communication terminal;
   control a mobile communication terminal tester to send a first command to a subscriber identity module (SIM) card of the mobile communication terminal, to cause the mobile communication terminal to switch to the selected communication frequency band;
   select one or more service modes for the mobile communication terminal that need to be tested under the selected communication frequency band, and set a test sequence of the one or more service modes;

set a use duration for each of the one or more service modes, a test frequency for each of the one or more service modes, and an test interval for each of the one or more service modes upon condition that the service mode needs to be tested more than one time;

select a service mode in accordance with the test sequence;

control the mobile communication terminal tester to send a second command to the SIM card, to cause the mobile communication terminal using the selected service mode;

measure the total time of using the selected service mode;

obtain test data of the mobile communication terminal according to the test frequency, the test interval, the total time, and the use duration of the selected service mode;

generate a report based on the test data;

repeat (e) to (i) until all the service modes need to be tested under the selected communication frequency band have been selected;

repeat (a) to (j) upon condition that another communication frequency band needs to be tested; and output a test result of the mobile communication terminal according to the report(s).

7. The electronic device according to claim 6, wherein the one or more modules further comprising instructions to:

synchronize the mobile communication terminal and the mobile communication terminal tester using the SIM card, in order the mobile communication terminal and the mobile communication terminal tester recognize each other.

8. The electronic device according to claim 6, wherein the communication frequency band is selected from global system for mobile communications (GSM)900, GSM1900, GSM 800, and GSM1800.

9. The electronic device according to claim 6, wherein the one or more service modes are selected from a sleep mode, a standby mode, a talk mode, and an out of service mode.

10. The electronic device according to claim 6, wherein the test data comprises the current and the voltage of the mobile communication terminal.

11. A non-transitory storage medium having stored thereon instructions that, when executed by a processor of an electronic device, causes the processor to perform a method of automatically testing a mobile communication terminal, wherein the method comprises:

(a) selecting a communication frequency band for the mobile communication terminal;

(b) controlling a mobile communication terminal tester to send a first command to a subscriber identity module (SIM) card of the mobile communication terminal, to cause the mobile communication terminal to switch to the selected communication frequency band;

(c) selecting one or more service modes for the mobile communication terminal that need to be tested under the selected communication frequency band, and setting a test sequence of the one or more service modes;

(d) setting a use duration for each of the one or more service modes, a test frequency for each of the one or more service modes, and an test interval for each of the one or more service modes upon condition that the service mode needs to be tested more than one time;

(e) selecting a service mode in accordance with the test sequence;

(f) controlling the mobile communication terminal tester to send a second command to the SIM card, to cause the mobile communication terminal using the selected service mode;

(g) measuring the total time of using the selected service mode;

(h) obtaining test data of the mobile communication terminal according to the test frequency, the test interval, the total time, and the use duration of the selected service mode;

(i) generating a report based on the test data;

(j) repeating (e) to (i) until all the service modes need to be tested under the selected communication frequency band have been selected;

(k) repeating (a) to (j) upon condition that another communication frequency band needs to be tested; and (l) outputting a test result of the mobile communication terminal according to the report(s).

12. The non-transitory storage medium according to claim 11, wherein before (a) the method further comprises:

synchronizing the mobile communication terminal and the mobile communication terminal tester using the SIM card, in order the mobile communication terminal and the mobile communication terminal tester recognize each other.

13. The non-transitory storage medium according to claim 11, synchronizing the mobile communication terminal and the mobile communication terminal tester using the SIM card, in order the mobile communication terminal and the mobile communication terminal tester recognize each other.

14. The non-transitory storage medium according to claim 11, wherein the one or more service modes are selected from a sleep mode, a standby mode, a talk mode, and an out of service mode.

15. The non-transitory storage medium according to claim 11, wherein the test data comprises the current and the voltage of the mobile communication terminal.

* * * * *